US007992762B2

(12) United States Patent
Sato et al.

(10) Patent No.: US 7,992,762 B2
(45) Date of Patent: Aug. 9, 2011

(54) FRICTIONALLY PRESS-BONDED MEMBER

(75) Inventors: Tomohiko Sato, Aichi-ken (JP); Takeo Yamamoto, Nisshin (JP); Kaname Onoda, Chiryu (JP); Yoshikazu Kawabata, Handa (JP)

(73) Assignees: Toyota Jidosha Kabushiki Kaisha, Toyota-shi, Aichi-ken (JP); JTEKT Corporation, Osaka (JP); JFE Steel Corporation, Tokyo (JP)

( * ) Notice: Subject to any disclaimer, the term of this patent is extended or adjusted under 35 U.S.C. 154(b) by 9 days.

(21) Appl. No.: 12/441,414

(22) PCT Filed: Sep. 13, 2007

(86) PCT No.: PCT/JP2007/068473

§ 371 (c)(1), (2), (4) Date: Mar. 16, 2009

(87) PCT Pub. No.: WO2008/050563

PCT Pub. Date: May 2, 2008

(65) Prior Publication Data

US 2010/0062277 A1 Mar. 11, 2010

(30) Foreign Application Priority Data

Sep. 29, 2006 (JP) ................................ 2006-267907

(51) Int. Cl.
*B23K 20/12* (2006.01)

(52) U.S. Cl. .................... 228/112.1; 228/113; 228/114; 228/2.1

(58) Field of Classification Search ............... 228/112.1, 228/113, 114, 2.1
See application file for complete search history.

(56) References Cited

U.S. PATENT DOCUMENTS

| | | | | |
|---|---|---|---|---|
| 6,736,910 | B2 * | 5/2004 | Toyooka et al. | 148/320 |
| 2004/0238594 | A1 * | 12/2004 | Juranitch et al. | 228/29 |
| 2005/0101392 | A1 * | 5/2005 | Sakurai et al. | 464/182 |
| 2007/0101789 | A1 * | 5/2007 | Kondo et al. | 72/97 |

FOREIGN PATENT DOCUMENTS

| | | |
|---|---|---|
| GB | 2 345 490 | 7/2000 |
| GB | 2 365 022 | 2/2002 |
| JP | 59-179717 | 10/1984 |
| JP | 60-116722 | 6/1985 |
| JP | 10-77777 | 3/1998 |
| JP | 10-267027 | 10/1998 |
| JP | 2002-147420 | 5/2002 |
| KR | 2002-0021685 | 3/2002 |
| WO | WO 2005116284 A1 * | 12/2005 |

OTHER PUBLICATIONS

"Mead Info"; http://www.meadinfo.org/2010/03/s45c-jis-mechanical-properties.html; Steel S45C properties.*

Translation of International Preliminary Report on Patentability for PCT/JP2007/068473 dated Apr. 9, 2009.

Notice of Grounds for Rejection for Korean Patent Appl. No. 2009-7004180 dated Mar. 4, 2011.

* cited by examiner

*Primary Examiner* — Jessica L Ward
*Assistant Examiner* — Erin B Saad
(74) *Attorney, Agent, or Firm* — Finnegan, Henderson, Farabow, Garrett & Dunner, LLP

(57) ABSTRACT

A frictionally press-bonded member includes a steel pipe, and a stab. The steel pipe has opposite ends. The stab is frictionally press-bonded to at least one of the opposite ends of the steel pipe. The steel pipe is subjected to a normalizing treatment before being frictionally press-bonded to the stab.

6 Claims, 4 Drawing Sheets

5 3 4 1 2 4 3 5

FRICTIONALLY PRESS-BONDED MEMBER

TECHNICAL FIELD

The present invention relates to a frictionally press-bonded member, which is made by frictionally press-bonding a steel pipe and a stab.

BACKGROUND ART

Frictionally press-bonded members have been employed to make propeller shafts or drive shafts, which transmit driving forces to wheels for driving automobiles, in order to make them lightweight to improve the automobiles' mileage. The frictionally press-bonded members have been made by frictionally pressing bonding steel pipes and stabs.

Such frictionally press-boned members have been required conventionally to exhibit dimensional accuracy. Accordingly, it has been a usual practice to use steel pipes, which have been made in the following manner. For example, the steel pipes are cold drawn, and are then subjected to an annealing treatment at the $Ac_1$ transformation temperature in order to make them free from strains and residual stresses. However, when frictionally press-bonding the pipes, which have been cold drawn and followed by the annealing treatment, and stabs, there might arise problems that the resulting frictionally press-bonded members have exhibited unstable fatigue strength so that they would not produce targeted strength. Consequently, as disclosed in Japanese Unexamined Patent Publication (KOKAI) Gazette No. 10-267,027, it is necessary to perform a heat treatment to obtain predetermined strength after frictionally press-bonding a steel pipe and a stab. Alternatively, it is needed to design the strength of resultant frictionally press-bonded member while taking the strength lowering allowance into account.

However, it is not appropriate to give frictionally press-bonded members desired strength assuredly by performing a heat treatment after frictionally press-bonding steel pipes and stabs, because such a countermeasure not only increases the production costs but also deteriorates the productivity. Moreover, note that the strength lowering allowance of resultant frictionally press-bonded member depends on the frictionally press-bonding conditions. Accordingly, it has not been practical at all to design the strength of resultant frictionally press-bonded member while taking the strength lowering allowance into account, and additionally it has been difficult to guarantee the qualities of resultant frictionally press-bonded member. Consequently, it has been desired to develop a frictionally press-bonded member whose strength hardly lowers even after it has undergone frictional press-bonding.

DISCLOSURE OF THE INVENTION

The present invention has been developed in view of the aforementioned circumstances. It is therefore an object of the present invention to provide a frictionally press-bonded member, which has a good fatigue characteristic, that is, which exhibits a fatigue strength, being substantially equivalent to a fatigue strength of a steel pipe proper before being subjected to frictionally press-bonding, even after undergoing frictionally press-bonding.

A frictionally press-bonded member according to the present invention comprises:

a steel pipe having opposite ends;

a stab frictionally press-bonded to at least one of the opposite ends of the steel pipe; and the steel pipe being subjected to a normalizing treatment before being frictionally press-bonded to the stab.

The present frictionally press-bonded member is made by frictionally press-bonding a steel pipe, which has been subjected to a normalizing treatment, and a stab. Accordingly, it is possible to inhibit the bonded portion between the steel pipe and the stab from exhibiting a lowered fatigue strength. Moreover, the present frictionally press-bonded member can keep exhibiting a fatigue strength, which substantially equivalent to that of a steel pipe proper before being subjected to frictionally press-bonding, even after undergoing frictionally press-bonding. Consequently, it is not necessary to perform a heat treatment to the present frictionally press-bonded member for further improving the strength after frictionally press-boding it with a stab. In addition, since the fatigue strength of the present frictionally press-bonded member is substantially equivalent to that of a steel pipe proper before being subjected to frictionally press-bonding, it is possible to assure the qualities of the present frictionally press-bonded member so as to be as good as those of a steel pipe proper, which exhibits strength before being subjected to frictionally press-bonding.

In the present frictionally press-bonded member, the steel pipe, which has been subjected to the normalizing treatment, can preferably have a metallic structure whose major component is pearlite. Since the pearlite structure exhibits relatively good hardenability, the pearlite structure can reduce the tensile residual stress that occurs adjacent to the bonded portion between the steel pipe and the stab in the present frictionally press-bonded member. Note that the wording, "a metallic structure whose major component is pearlite," herein represents that, in a metallic micrograph in which the metallic structure of the normalized steel pipe is taken under magnification×400, pearlite accounts for from 50 to 100%, further preferably from 80 to 98%, furthermore preferably from 90 to 98%, of the entire area of the metallic micrograph, and metallic structures other than pearlite account for the balance.

In the present frictionally press-bonded member, the steel pipe can preferably comprise a steel alloy. The steel pipe, which comprises a steel alloy of high strength, can make the resulting present frictionally press-bonded member more lightweight. More specifically, it is advisable that the steel pipe can preferably comprise: carbon (C) in an amount of from 0.3 to 0.5% by mass; silicon (Si) in an amount of from 0.01 to 0.5% by mass; manganese (Mn) in an amount of from 0.5 to 2% by mass; and the balance being iron (Fe) and inevitable impurities. In addition, the steel pipe can further preferably comprise: C in an amount of from 0.34 to 0.48% by mass, furthermore preferably from 0.39 to 0.46% by mass; Si in an amount of from 0.10 to 0.40% by mass, furthermore preferably from 0.15 to 0.35% by mass; Mn in an amount of from 1.10 to 1.80% by mass, furthermore preferably from 1.30 to 1.70% by mass; and the balance being Fe and inevitable impurities.

Since the present frictionally press-bonded member is inhibited from exhibiting a lowered fatigue strength even after undergoing frictionally press-bonding. That is, to the extent that the fatigue strength of a steel pipe proper before being subjected to frictionally press-bonding is assured, the present frictionally press-boned member can assuredly exhibit a good fatigue strength. Therefore, it is possible to assure the qualities of the present frictionally press-bonded member with ease.

Moreover, the present frictionally press-bonded member can assuredly exhibit a good fatigue strength by means of a steel pipe proper before being subjected to frictionally press-bonding, one of the constituent elements, alone. Accordingly, it is not needed to perform a heat treatment to the present frictionally press-bonding member in order to further improve the fatigue strength. Consequently, it is possible to produce a frictionally press-bonded member, which can exhibit a desirable fatigue strength by simply frictionally press-bonding the steel pipe and the stab and followed by letting the resulting frictionally press-bonded member to cool. Thus, the production process for the present frictionally press-bonded member is so simplified that it is possible to manufacture the present frictionally press-bonded member with remarkably enhanced productivity.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

BEST MODE FOR CARRYING OUT THE INVENTION

Having generally described the present invention, a further understanding can be obtained by reference to the specific preferred embodiments which are provided herein for the purpose of illustration only and not intended to limit the scope of the appended claims.

Although steel pipes, which are made of the same material and are formed as the same shape, respectively, do not exhibit any changing fatigue characteristics, which depend on heat treatments, the inventors of the present invention found out that, when frictionally press-bonding steel pipes to stabs to make frictionally press-bonded members, the resultant frictionally press-bonded members exhibit changing fatigue characteristics, which depend on heat treatments or pretreatments to the steel pipes. For example, FIG. 1 (*a*) shows a conceptual diagram for illustrating the comparison between a torsional fatigue characteristic (designated with the continuous line) that was exhibited by a steel pipe "P1" being subjected to a normalizing treatment, one of the pretreatments, and a torsional fatigue characteristic (designated with the dashed line) that was exhibited by a frictionally press-bonded member "A" made using the normalized steel pipe "P1." On the other hand, FIG. 1 (*b*) shows a conceptual diagram for illustrating the comparison between a torsional fatigue characteristic (designated with the continuous line) that was exhibited by a steel pipe "P2" being subjected to an annealing treatment, another one of the pretreatments, and a torsional fatigue characteristic (designated with the dashed line) that was exhibited by a frictionally press-bonded member "B" made using the annealed steel pipe "P2."

Figure 1:
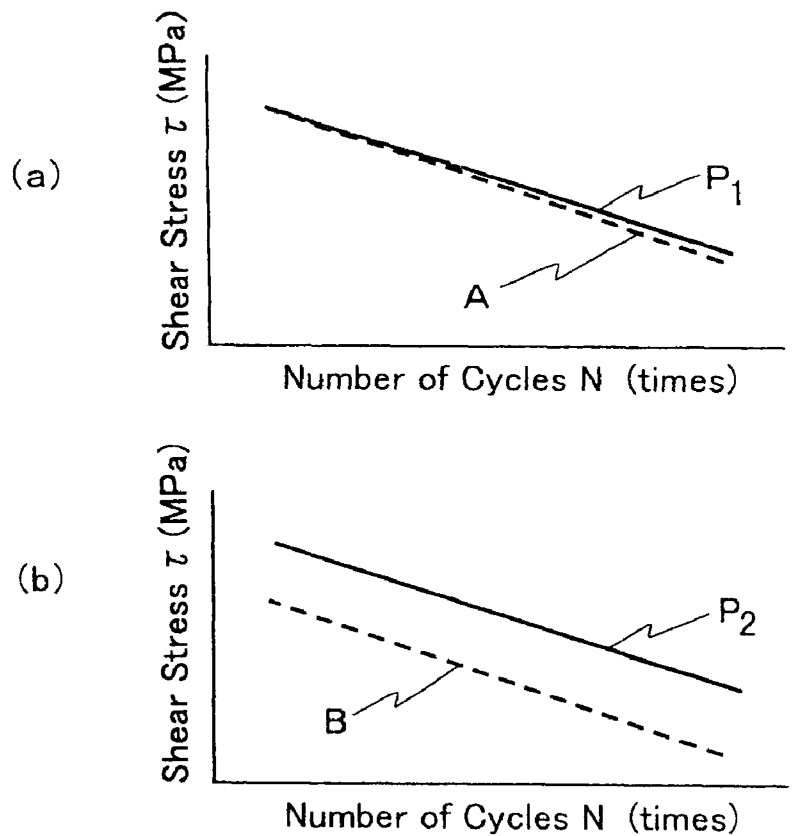
FIG. 1 is a conceptual diagram for illustrating the torsional fatigue characteristics of steel pipe and frictionally press-bonded member made therefrom: wherein (a) shows the torsional fatigue characteristics of steel pipe and frictionally press-bonded member made therefrom when a normalized steel pipe "P1" was used; and (b) shows the torsional fatigue characteristics of steel pipe and frictionally press-bonded member made therefrom when an annealed steel pipe "P2" was used.

As can be seen from FIG. 1 (*a*), the frictionally press-bonded member "A," in which the normalized steel pipe "P1" was used, exhibited a fatigue characteristic, which substantially coincided with that of a steel pipe proper before being subjected to frictionally press-bonding exhibited. In other words, even after being subjected to frictionally press-bonding, the resulting frictionally press-bonded member "A" did not show any changing fatigue characteristic. On the contrary, however, as can be seen from FIG. 1 (*b*), the frictionally press-bonded member "B," in which the annealed steel pipe "P2" was used, exhibited a fatigue characteristic, which differed from that of a steel pipe proper before being subjected to frictionally press-bonding exhibited. Specifically, when being subjected to frictionally press-bonding, the resultant frictionally press-bonded member "B" showed a degraded fatigue characteristic.

The aforementioned phenomena are believed to result from the facts that the normalized steel pipe "P1," which was used in a frictionally press-bonded member "A" according to the present invention, and the annealed steel pipe "P2," which was used in a frictionally press-bonded member "B" according to a comparative example, had different metallic structures because of the difference in the heat-treatment temperatures which they experienced.

When frictionally press-bonding a steel pipe to a stab, the bonded portion between them and the thermally-affected portions adjacent to the bonded portion (these are hereinafter simply referred to as a "bond" collectively) have metallic structures, which have been temporarily turned into an austenite structure by the heat generation during frictionally press-bonding. Then, the general portions, which are not subjected to frictionally press-bonding, deprive the resulting austenite structure of heat so that the austenite structure cools rapidly to eventually transform into a martensite structure or a pearlite structure. Specifically, the bond undergoes volumetric contraction as it cools, and then, when the cooling develops further to start the martensitic transformation, it undergoes volumetric expansion as the martensitic transformation develops. On this occasion, a compression stress arises in the general portion of the pipe, which neighbors the bond, upon the volumetric contraction of bond. Moreover, a tensile stress arises in the general portion of the steel pipe, which neighbors the bond, upon the volumetric expansion of bond. The summed stress of the thus generated compression stress and tensile stress turns into a residual stress to result in residing in the general portion of the steel pipe, which neighbors the bond of the resultant frictionally press-bonded member.

Figure 2:
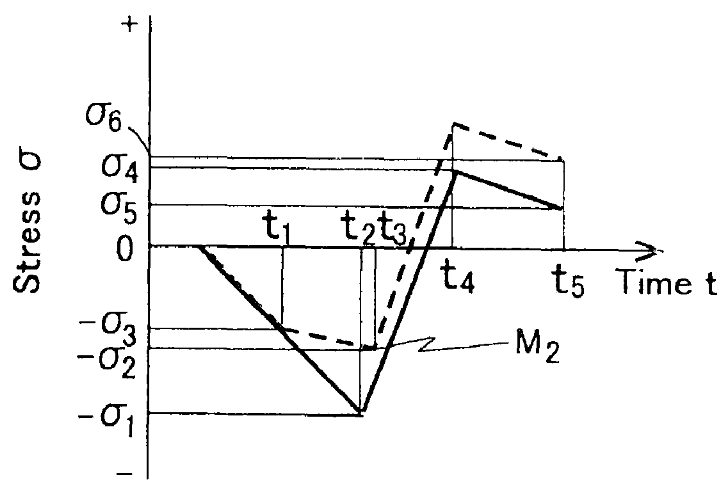
FIG. 2 is an explanatory diagram for illustrating the stress change at around a frictionally press-bonded portion during cooling.

FIG. 2 conceptually illustrates the change of stress, which arises in the bond during cooling, with time. In FIG. 2, the continuous line specifies the change of stress, which arises in a frictionally press-bonded member according to the present invention made using the normalized steel pipe "P1," with time. On the other hand, the dashed line specifies the change of stress, which arises in a conventional frictionally press-bonded member made using the annealed steel pipe "P2," with time. Note that the vertical axis designates stresses, tensile stresses are plotted on the positive side, and compression stresses are plotted on the negative side. Since the steel pipe "P1" has been subjected to a normalizing treatment, in which a pretreatment for once turning the entirety into an austenite single phase is followed by air cooling, it has a metallic structure whose major component is a pearlite structure as a whole. Accordingly, although the bond is again turned into an austenite structure by the heat generation during frictionally press-bonding, it stands to cool so that it undergoes volumetric contraction, which results from cooling, up to the time $t_2$ at which the martensitic transformation occurs. Consequently, during the time interval between the start of cooling and the time $t_2$ a compression stress $\sigma_1$ arises in the general portion of the normalized steel pipe "P1," which neighbors the bond. Thereafter, since the bond undergoes volumetric expansion, up to the time $t_4$ at which the martensitic transformation completes, as the martensitic transformation develops, a tensile stress arises in the general portion to cancel the compression stress $\sigma_1$ therein so that a tensile stress $\sigma_4$ resides in the bond. Then, up to the time $t_5$ at which the bond cools to room temperature, the bond undergoes volumetric contraction to reduce the tensile stress $\sigma_4$ so that a tensile stress $\sigma_5$ comes to reside in the bond eventually.

On the other hand, the conventional frictionally press-bonded member, which is specified with the dashed line in FIG. 2, uses the steel pipe "P2," which has been annealed at a predetermined temperature of less than the $A_1$ line (i.e., the eutectoid line at 723° C.). Accordingly, the metallic structure of the annealed steel pipe "P2" has turned into a softened metallic structure, which includes globular cementite abundantly. In general, a globular cementite structure exhibits a slower solid-solving rate of cementite upon heating than a pearlite structure does. Consequently, a globular cementite structure tends to show lowering hardenability upon being heated for a short period of time, like during frictionally press-bonding. As a result, the pearlite transformation is likely to take place in the boundary between the bond and the general portion at the time $t_1$ during cooling after frictionally press-bonding. When comparing an austenite structure with a pearlite structure, a pearlite structure undergoes smaller thermal contraction than an austentite structure does. Accordingly, a compression stress $\sigma_2$ arises in the general portion of the annealed steel pipe "P2" up to the time $t_3$ at which the martensitic transformation occurs, and the absolute value of the compression stress $\sigma_2$ is smaller than that arises in the frictionally press-bonded member according to the present invention made using the normalized steel pipe "P1." Thereafter, as shown in FIG. 2, the bond other than the boundary undergoes volumetric expansion, which results from the development of the martensitic transformation, and then undergoes volumetric contraction, which results from cooling down to room temperature, in the same manner as the volumetric expansion and volumetric contraction that the frictionally press-bonded member according to the present invention undergoes. Consequently, when the conventional frictionally press-bonded member, which is made using the annealed steel pipe "P2," is cooled to room temperature, a larger tensile stress comes to reside in the general portion than that resides in the general portion of the frictionally press-bonded member according to the present invention, which is made using the normalized steel pipe "P1." Specifically, a larger tensile stress $\sigma_6$, which is enlarged by the lowered compression magnitude resulting from the pearlite transformation, resides in the bond of the conventional frictionally press-bonded member, and is greater than the tensile stress $\sigma_5$, which resides in the bond of the frictionally press-bonded member according to the present invention (i.e., $\sigma_6>\sigma_5$). As having been known generally, since the less the tensile residual stress is the higher the fatigue strength is, the general portion in which the larger tensile residual stress arises in accordance with the above-described mechanisms is a part that exhibits the lowest fatigue strength. Therefore, using the normalized steel pipe "P1" not only makes it possible to produce a frictionally press-bonded member with higher fatigue strength than using the annealed steel pipe "P2" does, but also makes it possible to produce a frictionally press-bonded member, which exhibits a fatigue strength being substantially equivalent to that of a steel pipe proper before being subjected to frictionally press-bonding, because the normalized steel pipe "P1" possesses less residual stress.

As a raw material for the steel pipe which is used to make a frictionally press-bonded member according to the present invention, it is preferable to cut structural steel pipes, which are made of low-carbon steels, intermediate-carbon steels and high-carbon steels, or structural steel pipes, which are made of alloy steels, to a predetermined length to use. As for the former structural steel pipes which are made of low-carbon steels, intermediate-carbon steels and high-carbon steels, it is possible to name those which are made of S30C through S50C according to Japanese Industrial Standard (hereinafter abbreviated to "JIS"), and those which are made of STKM11 through STKM17 according to JIS. As for the later structural pipes which are made of alloy steels, it is possible to name those which are made of alloys steels such as SMn433 through SMn443, SMnC443, SCr430 through SCr445 and SCM430 through SCM445 according to JIS. Moreover, as for alloy steels which make the latter structural pipes, it is possible to further add B in an amount of from 5 to 30 ppm by mass and Ti in an amount of from 0.01 to 0.03% by mass to the aforementioned alloy steels to use. In addition, although a raw material for the stab which is used to make a frictionally press-bonded member according to the present invention is not limited in particular, it is preferable to use steel bars, which have the same compositions as those of the aforementioned structural steel pipes.

Note that SMn438, an example of the aforementioned alloy steels, can be defined to have the following composition. Namely, according to JIS, SMn438 comprises C in an amount of from 0.40 to 0.46% by mass; Si in an amount of from 0.15 to 0.35% by mass; Mn in amount of from 1.35 to 1.65% by mass; and the balance being Fe and inevitable impurities.

As described above, the steel pipe, which is used to make a frictionally press-bonded member according to the present invention, comprises a normalized steel pipe. For example, the steel pipe can preferably be subjected to a normalizing treatment, in which a steel pipe proper before being subjected to frictionally press-bonding is heated to an austenite region (i.e., the $A_3$ line or higher, at a temperature of from 850 to 950° C., for instance) and is held thereat for from 1 to 30 minutes and is thereafter stood to cool in air, in order to make the resultant normalized steel pipe free from the strains upon producing the steel pipe proper and the residual stresses resulting therefrom. It is further preferable to heat a steel pipe proper before being subjected to frictionally press-bonding to a temperature of from 850 to 950° C., furthermore preferably from 880 to 940° C., moreover preferably from 910 to 935° C., and to hold it thereat for from 1 to 30 minutes, furthermore preferably for from 4 to 26 minutes, moreover preferably for from 8 to 22 minutes. The normalized steel pipe can preferably have a metallic structure whose major component is pearlite as a whole. However, as far as not troubling the hardenability and machinability of the resultant normalized steel pipe, the metallic structure can further contain even a ferrite structure or a bainite structure slightly.

EXAMPLE

A frictionally press-bonded member according to the present invention will be hereinafter described in more detail with reference to a specific example and a comparative example.

(Frictionally Press-Bonded Member)

Figure 3:
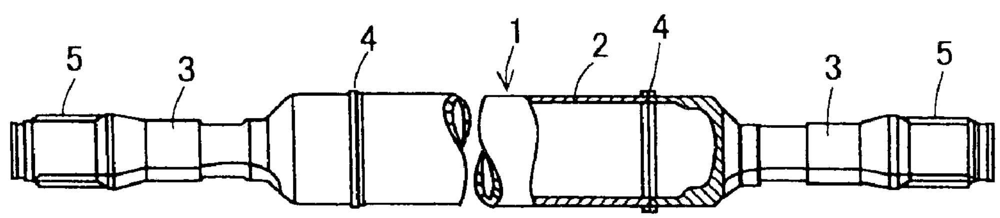
FIG. 3 is a partially cross-sectional diagram for illustrating a tube shaft according to an example of the present invention.

FIG. 3 illustrates a tube shaft, a frictionally press-bonded member according to an example of the present invention.

As illustrated in FIG. 3, a tube shaft 1 comprised a steel pipe 2, paired stabs 3, 3, and paired frictionally press-bonded portions 4, 4. The tube shaft 1 was manufactured in the following manner. The steel pipe 2 was cut to a predetermined length. The stabs 3, 3 were machined to predetermined dimensions, and were then frictionally press-bonded to the opposite ends of the pipe 2 to make the frictionally press-bonded portions 4, 4. Note that the resulting tube shaft 1 was provided with paired splines 5, 5 at the opposite ends. The splines 5, 5 were disposed for attaching constant velocity universal joint to the resultant tube shaft 1, and were processed by rolling.

The steel pipe 2 of the tube shaft 1 was made of SMn438 according to JIS, an alloy steel for structural steel pipes. Specifically, the JIS SMn438 alloy steel comprised C in an amount of 0.41% by mass, Si in an amount of 0.2% by mass, Mn in an amount of 1.55% by mass, and the balance being Fe and inevitable impurities. Moreover, the steel pipe 2 was turned into the normalized steel pipe "P1" whose outside diameter was 40 mm and thickness was 4 mm. The resultant normalized steel pipe "P1" exhibited the following mechanical properties:

a tensile strength of 840 MPa;

a yield strength of 540 MPa; and an elongation of 20% when being measured with the cut-out JIS #12 test specimen in the longitudinal direction.

In addition, the steel pipe 2 was subjected to a normalizing treatment under such conditions that a raw-material steel pipe 2 was heated to 920° C. for 10 minutes and was thereafter air-cooled to room temperature.

On the other hand, the stabs 3, 3 were machined to the shape shown in FIG. 3 by turning a steel bar stock, which was made of the same JIS SMn438 alloy steel for structural steel pipes as set forth above. The resulting stabs 3, 3 were provided with the spline 5, respectively, and their outer peripheral layers were thereafter subjected to an induction hardening treatment followed by a tempering treatment.

(Frictionally Press-Bonding Method)

Using an automatic frictionally press-bonding machine, the normalized steel pipe "P1" and the stabs 3, 3 were frictionally press-bonded together under the conditions described below. Thus, a tube shaft "1*a*" according to an example of the present invention was manufactured.

The normalized steel pipe "P1" and the stabs 3, 3 were subjected to such a frictionally heating step that they were heated frictionally by being rotated at a frictional speed of 1,800 rpm and being brought into contact with each other by a frictional thrust of 23 kN for a frictionally press-contacting time of 8 seconds. Then, the normalized steel pipe "P1" and the stabs 3, 3 were subjected to such an upsetting step that they were brought into contact with each other with an interference allowance of 4 mm by an upsetting thrust of 45 kN. After completing the upsetting step, the normalized steel pipe "P1" and the stabs 3, 3 were left to stand to cool.

COMPARATIVE EXAMPLE

Except that the annealed steel pipe "P2," which was made of SMn40 as per JIS, was used for the steel pipe 2 instead of the normalized steel pipe "P1," which was made of SMn480 as per JIS, a tube shaft "1*b*" according to a comparative example was manufactured in the same manner as the tube shaft "1*a*" according to an example of the present invention.

(Testing Method)

The normalized steel pipe proper "P1," the annealed steel pipe proper "P2," the frictionally press-boned portions 4, 4 of the tube shaft "1*a*" according to an example of the present invention, and the frictionally press-boned portions 4, 4 of the tube shaft "1*b*" according to a comparative example were examined for the torsional fatigue characteristic, respectively.

A torsional fatigue test was carried out in compliance with JIS Z2273, "General Rule on Fatigue Testing Method for Metallic Material," while controlling the torques, which were applied to the test samples. Note that the major testing conditions were as set forth below:

the stress ratio was −1; and the repetitive cycle was from 1 to 3 Hz.

(Test Results)

FIGS. 4 through 7 illustrate the results of the torsional fatigue test.

Figure 4:
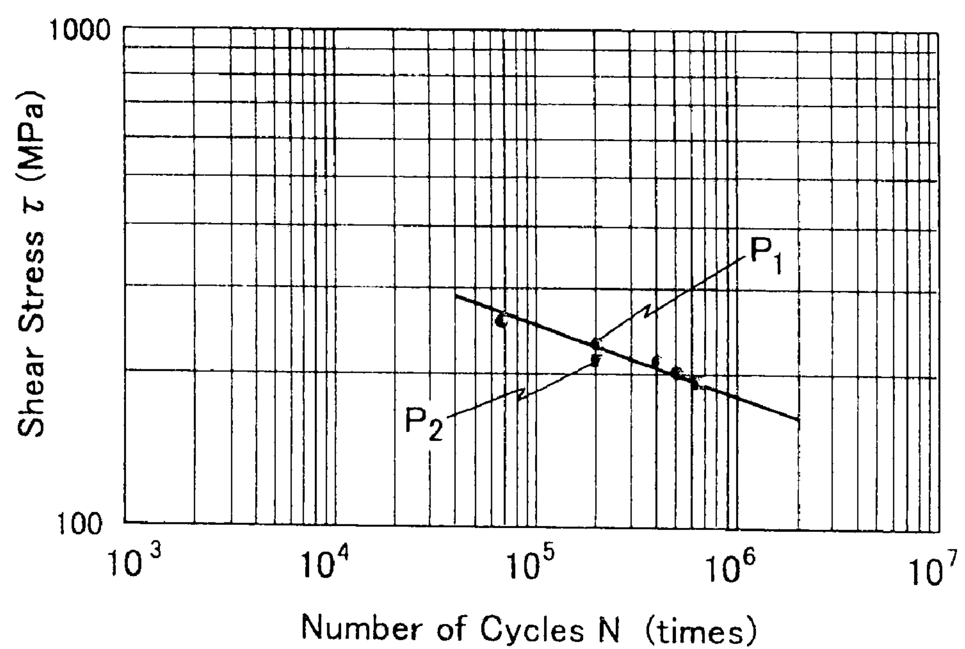
FIG. 4 is a τ-N line chart for illustrating the results of a fatigue test on a normalized steel pipe proper "P1" and an annealed steel pipe proper "P2."

FIG. 4 illustrates a τ-N line chart, which shows the fatigue test results on the normalized steel pipe proper "P1" and annealed steel pipe proper "P2." Note that the vertical axis designates the shear stresses τ applied to the normalized steel pipe proper "P1" and annealed steel pipe proper "P2," and the horizontal axis designates the number of repetitions N (times) up to the ruptures of the normalized steel pipe proper "P1" and annealed steel pipe proper "P2." The shear stresses τ, the shear stresses arising at the outer peripheral surface of the normalized steel pipe proper "P1" and annealed steel pipe proper "P2," were calculated in the units of $kgf/mm^2$ from the testing torques T (kgf·m) and the outside diameters $D_0$ (mm) and inside diameters $D_1$ (mm) of the normalized steel pipe proper "P1" and annealed steel pipe proper "P2," the test samples, using following equation (1).

$$\tau=\{16D_0T/\pi(D_0^4-D_1^4)\}\times 100 \qquad \text{Equation (1)}$$

In FIG. 4, the solid circles ● specify the test results on the normalized steel pipe proper "P1," and the solid squares ■ specify the test results on the annealed steel pipe proper "P2." It can be seen from FIG. 4 that the normalized steel pipe proper "P1" and annealed steel pipe proper "P2" exhibited the same fatigue characteristic substantially that did not depend on the heat treatments to which they had been subjected.

Figure 5:
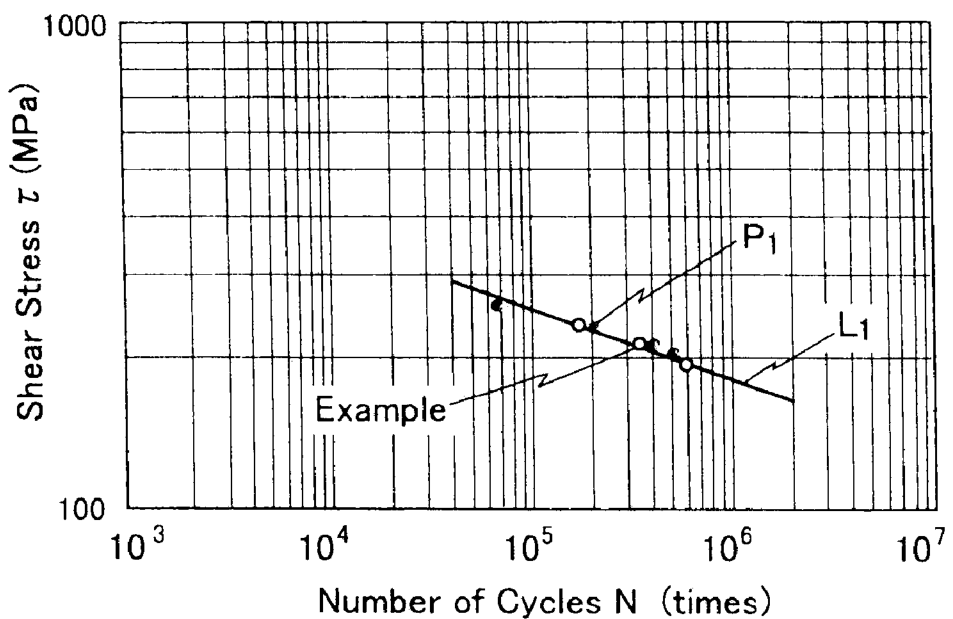
FIG. 5 is a τ-N line chart for illustrating the results of a fatigue test on a tube shaft "1*a*" according to an example of the present invention.

FIG. 5 illustrates a τ-N line chart, which shows the fatigue test results on the tube shaft "1*a*" according to an example of the present invention. Note that, in FIG. 5, the fatigue test results on the normalized steel pipe proper "P1," which are shown in FIG. 4, are illustrated concurrently. In FIG. 5, the blank circles ○ specify the test results on the tube shaft "1*a*" according to the present example, and the solid circles ● specify the test results on the normalized steel pipe proper "P1." It is apparent from FIG. 5 that the test results on the tube shaft "1*a*" coincide with the test results on the normalized steel pipe proper "P1" very well on the regression line "L1." To put it differently, it is understood that the tube shaft "1*a*" did exhibit no degraded fatigue strength upon being made by frictionally press-bonding and therefore kept the fatigue strength that the normalized steel pipe proper "P1" exhibited.

Figure 6:
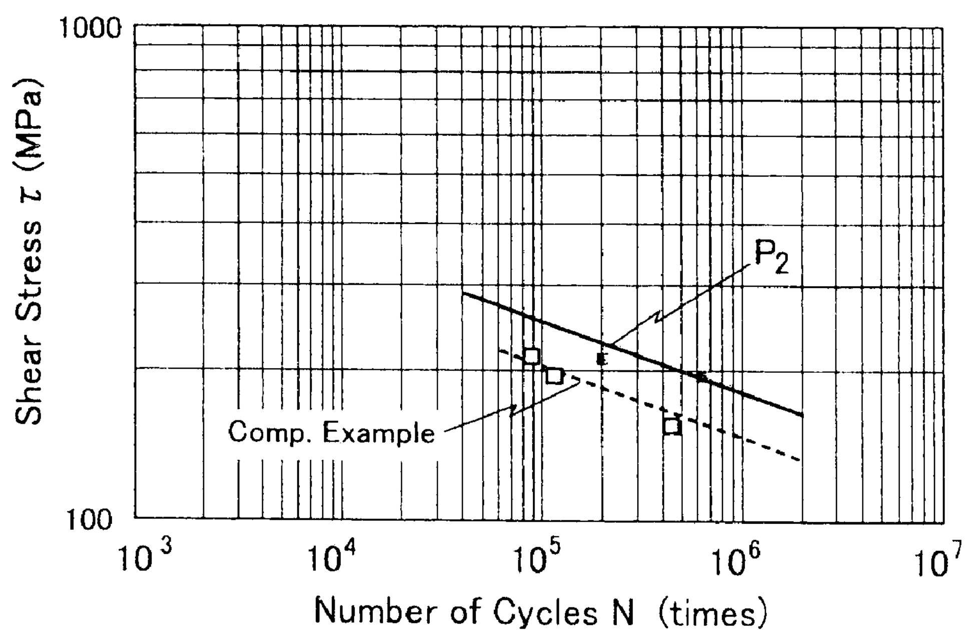
FIG. 6 is a τ-N line chart for illustrating the results of a fatigue test on a tube shaft "1*b*" according to a comparative example.

On the other hand, FIG. 6 illustrates a τ-N line chart, which shows the fatigue test results on the tube shaft "1*b*" according to a comparative example. Note that, in FIG. 6, the fatigue test results on the annealed steel pipe proper "P2," which are shown in FIG. 4, are illustrated concurrently. In FIG. 6, the blank squares □ specify the test results on the tube shaft "1*b*" according to a comparative example, and the solid squares ■ specify the test results on the annealed steel pipe proper "P2." It is apparent from FIG. 6 that the tube shaft "1*b*" exhibited a lower fatigue strength than the annealed steel pipe proper "P2" exhibited; that is, the tube shaft "1*b*," which was made by frictionally press-bonding the stabs 3, 3 to the opposite ends of the annealed steel pipe proper "P2," were provided with the frictionally press-bonded portions 4, 4 whose fatigue strength had degraded lower upon being made by frictionally press-bonding than the fatigue strength that the annealed steel pipe proper "P2" exhibited. Specifically, the tube shaft "1*b*" exhibited a fatigue strength, which was degraded by about 90% to the fatigue strength that the annealed steel pipe proper "P2" exhibited at the same number of repetitions N (times), for instance.

Figure 7:
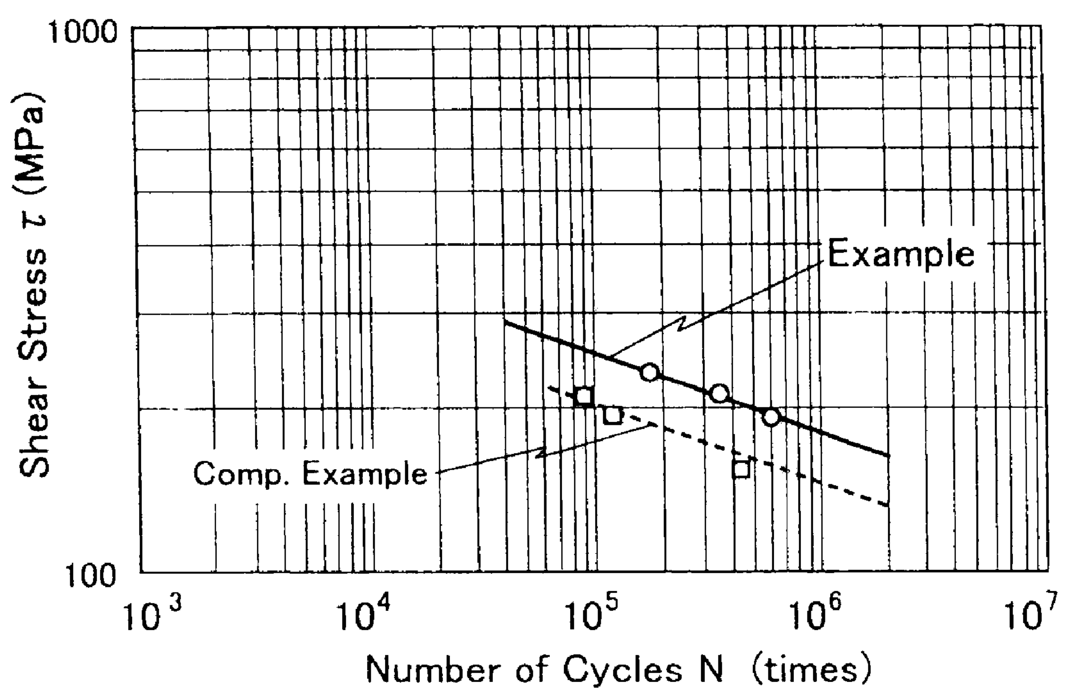
FIG. 7 is a τ-N line chart in which both results of the fatigue test on the tube shaft "1*a*" according to an example of the present invention and on the tube shaft "1*b*" according to a comparative example are included simultaneously for comparison.

Moreover, FIG. 7 is a τ-N line chart, which concurrently illustrates the fatigue test results on the tube shaft "1*a*" according to the present example and the test results on the tube shaft "1*b*" according to a comparative example. It is understood from FIG. 7 that the tube shaft "1*a*" according to the present example had a fatigue characteristic that was superior to that of the tube shaft "1*b*" according to a comparative example.

INDUSTRIAL APPLICABILITY

Thus, the frictionally press-bonded member is suitable for making component parts, which are required to exhibit predetermined strength, such as propeller shafts and drive shafts, which transmit driving forces to wheels for driving automobiles, or lower control arms, upper control arms and torque rods for automobile suspensions.

The invention claimed is:

1. A frictionally press-bonded member, comprising:

a normalized steel pipe having opposite ends; and a stab frictionally press-bonded to at least one of the opposite ends of the normalized steel pipe;

wherein the normalized steel pipe is obtained from a normalizing treatment of a steel pipe before being frictionally press-bonded to the stab, and wherein the normalized steel pipe has a metallic structure whose major component is pearlite.

2. The frictionally press-bonded member according to claim 1, wherein the normalized steel pipe comprises:

carbon (C) in an amount of from 0.3 to 0.5% by mass;

silicon (Si) in an amount of from 0.01 to 0.5% by mass;

manganese (Mn) in an amount of from 0.5 to 2% by mass; and the balance being iron (Fe) and inevitable impurities.

3. The frictionally press-bonded member according to claim 1, wherein the normalized steel pipe comprises at least one member selected from the group consisting of low-carbon steels, intermediate-carbon steels and high-carbon steels.

4. The frictionally press-bonded member according to claim 1, wherein the normalized steel pipe comprises an alloy steel.

5. The frictionally press-bonded member according to claim 4, wherein the normalized steel pipe further comprises:

boron (B) in an amount of from 5 to 30 ppm by mass; and titanium (Ti) in an amount of from 0.01 to 0.03% by mass.

6. The frictionally press-bonded member according to claim 1, wherein in the normalizing treatment a raw-material steel pipe is heated to a temperature of from 850 to 950° C. and is held thereat for from 1 to 30 minutes and is thereafter stood to cool in air.

* * * * *